(12) United States Patent
Lesellier (10) Patent No.: US 8,824,795 B2
(45) Date of Patent: Sep. 2, 2014

(54) DIGITAL IMAGE PROCESSING METHOD AND DEVICE FOR LIGHTENING SAID IMAGE

(75) Inventor: Estelle Lesellier, Meudon (FR)

(73) Assignee: ST-Ericsson (France) SAS, Grenoble (FR)

( * ) Notice: Subject to any disclaimer, the term of this patent is extended or adjusted under 35 U.S.C. 154(b) by 123 days.

(21) Appl. No.: 13/379,867

(22) PCT Filed: Jun. 18, 2010

(86) PCT No.: PCT/EP2010/058601
§ 371 (c)(1),
(2), (4) Date: Feb. 29, 2012

(87) PCT Pub. No.: WO2010/149575
PCT Pub. Date: Dec. 29, 2010

(65) Prior Publication Data
US 2012/0148155 A1    Jun. 14, 2012

(30) Foreign Application Priority Data

Jun. 22, 2009   (FR) ..................................... 09 54224

(51) Int. Cl.
*G06K 9/00*     (2006.01)
*G06T 5/00*     (2006.01)
*G06T 5/40*     (2006.01)
*H04N 1/407*    (2006.01)

(52) U.S. Cl.
CPC . *G06T 5/40* (2013.01); *G06T 5/009* (2013.01); *H04N 1/4074* (2013.01); *G06T 2207/10016* (2013.01); *G06T 2207/20012* (2013.01)
USPC ............................ 382/169; 348/687; 382/274

(58) Field of Classification Search
CPC ........................................................ H04N 9/77
USPC .......... 382/169, 172, 218, 168, 274; 348/371, 348/687
See application file for complete search history.

(56) References Cited

U.S. PATENT DOCUMENTS 7,315,657 B2 *   1/2008   Matsushima .................. 382/274
7,421,120 B2 *   9/2008   Kang ............................ 382/167
(Continued)

FOREIGN PATENT DOCUMENTS

EP          1400921 A2    3/2004
JP        2003046859 A    2/2003
(Continued)

OTHER PUBLICATIONS

Ping-Hsien Lin et al., "Tri-Histogram Equalization Based on First Order Statistics", Consumer Electronics, 2009, ISCE '09. IEEE 13th International Symposium on IEEE, Piscataway, NJ, USA, May 25, 2009, pp. 387-391 XP031484555, ISBN: 978-1-4244-2975-2.

(Continued)

*Primary Examiner* — Gregory M Desire
(74) *Attorney, Agent, or Firm* — Coats & Bennett, P.L.L.C.

(57) ABSTRACT

A method of processing a digital image, said image comprising a plurality of pixels, the method comprising a computation step (S1) wherein a histogram of the distribution of the number of pixels of the image as a function of their luminance is computed, a step (S2) for lightening the image based on said histogram comprising a subdivision (S20) of the pixels of the image into a first set of pixels having luminance values between a low threshold and a high threshold and into a second set of pixels having luminance values greater than said high threshold, a first luminance processing operation (S21) on the pixels of the first set of pixels and a second luminance processing operation (S22) on the pixels of the second set of pixels, the two luminance processing operations (S21, S22) being different, the first processing operation (S21) comprising an increase in the luminance of the pixels of the image.

26 Claims, 4 Drawing Sheets

(56) References Cited

U.S. PATENT DOCUMENTS

| | | |
|---|---|---|
| 7,646,931 B2 * | 1/2010 | Liu et al. .................... 382/274 |
| 7,940,426 B2 * | 5/2011 | Kuwata et al. ............. 358/3.01 |
| 7,982,807 B2 * | 7/2011 | Chen ........................... 348/687 |
| 7,986,351 B2 * | 7/2011 | Jiang et al. .................. 348/234 |
| 8,059,913 B2 * | 11/2011 | Kwon et al. ................ 382/274 |
| 8,174,611 B2 * | 5/2012 | Estevez et al. .............. 348/371 |
| 8,363,260 B2 * | 1/2013 | Kido ........................... 358/1.18 |
| 8,552,946 B2 * | 10/2013 | Kurokawa et al. ............. 345/89 |
| 2004/0091169 A1 * | 5/2004 | Park et al. ................... 382/274 |
| 2007/0041657 A1 * | 2/2007 | Rychagov et al. .......... 382/274 |
| 2007/0104387 A1 * | 5/2007 | Han et al. .................... 382/271 |
| 2008/0037867 A1 * | 2/2008 | Lee et al. .................... 382/168 |
| 2008/0037868 A1 * | 2/2008 | Han et al. .................... 382/169 |
| 2008/0056567 A1 * | 3/2008 | Kwon et al. ................ 382/168 |
| 2008/0100743 A1 * | 5/2008 | Cho et al. .................... 348/447 |
| 2008/0101697 A1 * | 5/2008 | Cho et al. .................... 382/169 |
| 2008/0186393 A1 * | 8/2008 | Lee et al. .................... 348/301 |
| 2008/0279459 A1 * | 11/2008 | Choi et al. .................. 382/218 |
| 2009/0009665 A1 | 1/2009 | Tsutsumi |
| 2009/0087092 A1 * | 4/2009 | Min et al. .................... 382/169 |

FOREIGN PATENT DOCUMENTS

| | | |
|---|---|---|
| JP | 2003069821 A | 3/2003 |
| JP | 2004145864 A | 5/2004 |
| JP | 2007115057 A | 5/2007 |
| JP | 2007194832 A | 8/2007 |
| JP | 2008228321 A | 9/2008 |
| WO | 2006108299 A1 | 10/2006 |
| WO | 2009029448 A1 | 3/2009 |

OTHER PUBLICATIONS

Translation of Japanese Office Action dated Mar. 3, 2014 for JP Patent Application No. 2012-515508, publication date Jul. 5, 2012.

* cited by examiner

DIGITAL IMAGE PROCESSING METHOD AND DEVICE FOR LIGHTENING SAID IMAGE

The invention relates to the processing of a digital image and more particularly to the lightening of a digital image and the lightening of a digital video.

When digital images, or digital videos, are captured using appliances such as, for example, digital cameras, the latter can include dark areas that can conceal certain original details, and it is then said that these areas of the image are underexposed. These images, or videos, can also be captured with backlighting, that is to say that the captured images include a very dark area and a very light area.

Currently, there are methods for revealing concealed details of the dark and/or light areas in a digital image that are based on a modification of the global brightness of the image. However, these processing operations rely on an average measurement of the brightness of the image that does not take into account local contrasts in the image. These processing operations therefore lead to a loss of overall contrast of the image and also a loss of detail in the very light or very dark areas of the image.

Other methods use a multiplying gain computed as a function of the brightness of the pixel, the same gain being applied to all the pixels with the same brightness in the image. However, these methods often lead to a "whiteout" phenomenon in the image, that is to say a loss of overall and local contrast of the image. In practice, this whiteout phenomenon appears upon a redistribution of the values of the pixels, either toward a higher portion of the available dynamic range of the image in the case of lightening, or toward a lower portion in the case of darkening. Moreover, this redistribution, or compression of the image, of the values of the pixels in the light or dark areas can introduce a loss of resolution, and therefore a loss of useful detail in these areas.

It is possible to cite, for example, the use of a physical flash that increases the general brightness of the scene and therefore the entire image. This physical flash can have the effect of saturating the light areas of the image leading to a loss of detail and contrast.

It is also possible to overexpose the image when it is captured, for example by increasing the exposure time and by keeping the other exposure parameters fixed, so as to make the dark portions of the scene visible, but the light portions of the scene are then saturated.

Conversely, by underexposing the image when it is captured, for example, by reducing the exposure time, the light areas of the scene are preserved, but this method generates a spurious noise in the dark areas that will also be amplified in the subsequent image processing operations.

There are also methods that optimize both the rendering of the dark and light portions of the scene which entail capturing a number of digital images with different exposure times to obtain sufficient information in order to reveal the hidden details by merging, but these processing operations are complex and costly.

In conclusion, all these methods have the drawback of modifying the brightness of the pixels by reducing the local contrast of the image, that is to say a dark pixel will be lightened in the same manner independently of whether it is situated in a dark area or in a light area. The lightening of a dark pixel in a light area in fact directly reduces the contrast of the area.

Furthermore, when a video is to be lightened, an inappropriate processing operation on the different images of the video can lead to an overall or local variation of the colours and of the lightening from one image to the next and therefore an instability over time in the content of the video.

According to one implementation and embodiment, there is proposed a method and a device for lightening an image and a digital video while preserving the contrast of the image and of the video, in particular in the light areas of the image.

According to another implementation and embodiment, it is proposed to lighten an image and a digital video while preserving the colours of the image and of the video.

Furthermore, it is also proposed to be able to lighten an image and a video captured by a camera or stored in a computer when they are edited. It is also proposed to perform this lightening processing operation before capture, for example, during the image preview mode offered by current digital cameras. It is also proposed to be able to lighten an image and a video at the time of their capture by a camera, before their storage, for example, within the camera.

According to one aspect, there is proposed a method of processing a digital image, said image comprising a plurality of pixels, the method comprising a computation step wherein a histogram of the distribution of the number of pixels of the image as a function of their luminance is computed.

This method also comprises a step for lightening the image based on said histogram comprising a subdivision of the pixels of the image into a first set of pixels having luminance values between a low threshold and a high threshold and into a second set of pixels having luminance values greater than said high threshold, a first luminance processing operation on the pixels of the first set of pixels and a second luminance processing operation on the pixels of the second set of pixels, the two luminance processing operations being different, the first processing operation comprising an increase in the luminance of the pixels of the image.

In other words, unlike in the state of the art where an identical processing operation is applied to all the pixels of an image, in this case two different processing operations are applied to two distinct sets of pixels. A first processing operation is applied to increase the luminance of a first set of dark pixels, in order to obtain the effect of a traditional flash, and a second processing operation is applied to redistribute all the values of the less dark pixels over the dynamic range of the second set of pixels in order, notably, to preserve the contrast of the image and avoid the "whiteout" phenomenon in the light areas of the image. This difference in processing operation makes it possible, among other things, to preserve the contrast of the light areas of the image.

There is thus provided a simple and inexpensive method for lightening the dark areas of a digital image while preserving the details and the contrast in the light areas of the image. This simple method makes it possible to save on processing steps because it requires only a single image. Furthermore, this method can be easily integrated into a digital camera that offers limited memory storage, energy storage and computation capabilities, such as, for example, a camera incorporated in a mobile telephony appliance. This method can also be integrated in an appliance including image processing facilities, such as a computer, for example.

According to one implementation, the first luminance processing operation comprises a gamma-type transfer function processing operation having an adaptable gamma parameter applied to the first set of pixels.

With a gamma-type transfer function, it is possible to sufficiently increase the luminance of the dark areas of the image.

According to another implementation, the second luminance processing operation comprises an equalization, preferably smoothed, of the histogram applied to the second set of pixels.

This makes it possible to preserve the contrast in the less dark areas of the image. Furthermore, this makes it possible to improve the visibility of the dark content of strongly-contrasted images, that is images that have a very dark area and a very light area.

Advantageously, the pixels of the second set have luminance values between the high threshold and a maximum threshold, and the computation step comprises a computation of an initial histogram, a determination of a luminance range above and below which the values of the initial histogram are nil, and a redistribution of the number of pixels of the luminance range in the range between said low threshold and said maximum threshold so as to compute said histogram.

It is thus possible to extend the initial histogram over the entire available dynamic range of the image.

According to another implementation, the computation step further comprises a determination of a first area between the bottom limit of the luminance range and an initial threshold and a determination of a second area between said initial threshold and the top limit of the luminance range, a first redistribution of the number of pixels of the first area in the range between said low threshold and said high threshold, and a second redistribution of the number of pixels of the second area in the range between said high threshold and said maximum threshold so as to compute said histogram.

Using the identification of two luminance areas, a very dark area and a less dark area, it is possible to extend, via the first redistribution, the very dark area of the histogram more significantly than the extension of the second, less dark area.

According to yet another implementation, the method further comprises a step for enhancement of some of the colours of the image comprising an amplification of the chrominance of each pixel of the image according to a ratio between the lightened luminance and the original luminance of said pixel of the image.

It is thus possible to enhance the colour of the images.

According to another implementation, the method is applied to the processing of a plurality of successive digital images of a video sequence, wherein a processing operation on each digital image is performed, said high threshold having a constant value for each processing operation on said successive digital images.

It is thus possible to provide a method for stabilizing over time the colours of a video sequence when the luminance of the images of the sequence is modified. Moreover, there is offered a possibility of displaying, in the preview mode, lightened images before capturing or not capturing an image.

The captured image can also be processed using image processing software embedded in the image capturing camera or in a computer.

According to another aspect, there is proposed a device for processing a digital image, said image comprising a plurality of pixels, the device comprising a computation means for computing a histogram of the distribution of the number of pixels of the image as a function of their luminance.

This device comprises a lightening means for lightening the image based on said histogram, said lightening means comprising a subdivision means for subdividing the pixels of the image into a first set of pixels having luminance values between a low threshold and a high threshold and into a second set of pixels having luminance values greater than said high threshold, a first luminance processing means for performing a first luminance processing operation on the pixels of the first set of pixels and a second luminance processing means for performing a second luminance processing operation on the pixels of the second set of pixels, the two luminance processing operations being different, the first processing operation comprising an increase in the luminance of the pixels of the image.

According to one embodiment, the first luminance processing means is configured to perform a gamma-type transfer function processing operation having an adaptable gamma parameter applied to the first set of pixels.

According to another embodiment, the second luminance processing means is configured to perform an equalization, preferably smoothed, of the histogram applied to the second set of pixels.

Advantageously, the pixels of the second set have luminance values between the high threshold and a maximum threshold, and said computation means is able to compute an initial histogram, to determine a luminance range above and below which the values of the initial histogram are nil, and to redistribute the number of pixels of the luminance range in the range between said low threshold and said maximum threshold so as to compute said histogram.

According to another embodiment, said computation means is able to determine a first area between the bottom limit of the luminance range and an initial threshold, a second area between said initial threshold and the top limit of the luminance range, and to redistribute the number of pixels of the first area in the range between said low threshold and said high threshold, and the number of pixels of the second area in the range between said high threshold and said maximum threshold so as to compute said histogram.

According to yet another embodiment, the device comprises a means of enhancing some of the colours of the image to amplify the chrominance of each pixel of the image according to a ratio between the lightened luminance and the original luminance of said pixel of the image.

According to another embodiment, the device is able to process a plurality of successive digital images of a video sequence, and said lightening means is able to lighten each successive digital image with a high threshold having a constant value.

According to another aspect, there is also proposed a wireless communication appliance comprising a digital image processing device as defined hereinabove.

Other benefits and characteristics will become apparent from studying the detailed description of implementations and embodiments of the invention that are by no means limiting and the appended drawings in which.

Figure 1:
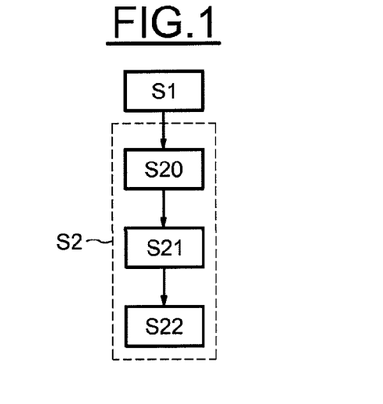
FIG. 1 diagrammatically illustrates the main phases of an implementation of a digital image processing method.

FIG. 1 diagrammatically shows the main phases of an implementation of a digital image processing method.

The digital image comprises a plurality of pixels.

There are a number of digital image formats: the "RGB" or "Red, Green and Blue" format, the "YUV" or "Luminance, Blue Chrominance and Red Chrominance" format, the "Lab" or "Clarity, Range of red-green axis and Range of yellow-blue axis" format, the "TSV" or "Hue, Saturation and Value" format, and so on.

All these formats have the common feature of defining each pixel of the digital image using three components that define a colour space.

The processing method is performed on the basis of digital images in the "YUV" format. In the case of an image that has a different format, the latter will be previously converted to the "YUV" format.

This processing method comprises a computation step S1 and a step S2 for lightening the image.

In the computation step S1, a histogram H(Y) of the distribution of the number of pixels of the image as a function of their luminance is computed. Y will be used to denote the luminance of a pixel of the image.

Advantageously, a sampled histogram of the image can be computed, that is to say, a histogram over a determined sample of pixels of the image is computed according to a sampling pitch Na. Thus, the number of pixels covered in the image is reduced in order to limit the number of computations and the number of memory access cycles. It is also possible to perform, before the computation step S1, a step for reducing the resolution of the digital image.

The step S2 for lightening the image comprises a subdivision S20 of the pixels of the image, a first luminance processing operation S21 and a second luminance processing operation S22. This lightening step S2 will be described with the next FIG. 2.

Figure 2:
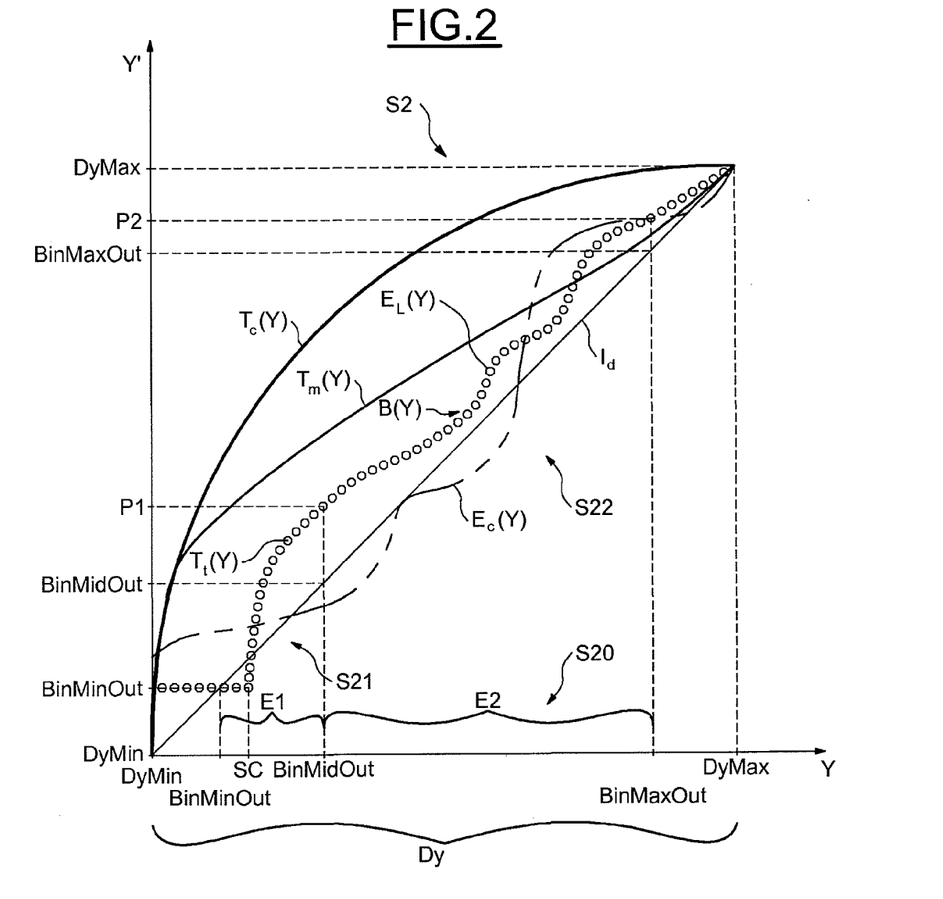
FIG. 2 diagrammatically illustrates an implementation of the image lightening step.

FIG. 2 diagrammatically shows an implementation of the step S2 for lightening the image.

It will be noted that the luminance dynamic range of an image is contained in a range Dy=[DyMin;DyMax].

In the step for subdividing the pixels of the image S20, the histogram H(Y), sampled or not, is used as a basis to determine a first set of pixels E1 having luminance values between a low threshold binMinOut and a high threshold binMidOut and a second set of pixels E2 having luminance values between said high threshold binMidOut and a maximum threshold binMaxOut. The range [binMinOut; binMaxOut] is therefore included within the luminance dynamic range of the image Dy.

For a photo, that is to say an individual digital image, coded on eight bits, the luminance dynamic range of the image will be contained within the range Dy=[0; 255]. In this case, the minimum value of the luminance dynamic range of the image DyMin is equal to 0 and the maximum value of the luminance dynamic range of the image DyMax is equal to 255. For a video coded on eight bits, the luminance dynamic range of a digital image of the video will be contained within the range Dy=[16; 235]. In this case, DyMin=16 and DyMax=235.

The low threshold binMinOut is greater than or equal to the minimum value of the luminance dynamic range of the image DyMin.

The maximum threshold binMaxOut is less than or equal to the maximum value of the luminance dynamic range of the image DyMax.

The high threshold binMidOut is a threshold below which it is considered that the image is very dark. This high threshold binMidOut can vary according to the luminance dynamic range of the image, the values of the histogram of the image, and the redistribution factor for the values of the pixels of the first and second sets. This high threshold binMidOut becomes all the greater as the luminance dynamic range of the image becomes smaller and it can be all the greater when the histogram includes a large segment of nil values. The high threshold binMidOut can typically take values in the range [10; 120]∈Dy.

FIG. 2 also represents an exemplary curve B(Y) of the luminance processing operations that correspond to the lightening step S2, and that are applied to all the pixels of the image, that is to say to the pixels that have a luminance within the range [binMinOut; binMaxOut]∈Dy.

The luminance processing operation B(Y) is a global processing operation represented by a transfer function applied to all the pixels of the image. This transfer function B(Y) corresponds to the first and second luminance processing operations S21, S22. It will be noted that the transfer function B(Y) differs from a simple conventional gamma transfer function $T_c(Y)$ that would be applied to all the pixels of the image, that is to say, to the range Dy. Furthermore, this transfer function B(Y) differs from a simple conventional equalization transfer function $E_c(Y)$, for equalizing the histogram H(Y) of the image, that would be applied to all the pixels of the image.

This transfer function B(Y) corresponds therefore to a global luminance processing operation including two different luminance processing operations S21, S22 applied to the two sets of pixels E1, E2, and not to one and the same processing operation applied to both sets of pixels.

Generally, in the first luminance processing operation S21, the luminance of the pixels of the first set of pixels E1 is increased and, in the second luminance processing operation S22, a different luminance processing operation is applied to the pixels of the second set of pixels E2.

In the first luminance processing operation S21, it is possible, for example, to apply a gamma-type transfer function $T_t(Y)$ to the values of the pixels of the first set of pixels E1, that is to say to the values contained in the range [binMinOut; binMidOut]. This gamma-type transfer function $T_t(Y)$ corresponds to a modified gamma transfer function $T_m(Y)$ which is preferentially translated so as to apply said modified gamma transfer function $T_m(Y)$ from a cut-off threshold SC, that is to say for pixel luminances contained in the range [SC; binMidOut], where the cut-off threshold SC is between the low threshold binMinOut and the high threshold binMidOut. The gamma-type transfer function $T_t(Y)$ has an adaptable gamma parameter γ. This gamma-type transfer function $T_t(Y)$ depends on the luminance dynamic range Dy of the image, and the increase in luminance of the pixels depends on the gamma parameter γ.

Furthermore, this gamma-type transfer function $T_t(Y)$ depends on the type of screen used to display the images, notably the contrast properties of such screens.

Generally, the value of the gamma parameter γ is contained in the range [0.4; 0.7].

For screens that have a good contrast, for example, the latest generations of liquid crystal display LCD screens of mobile telephones, or CRT, "Cathode Ray Tube", screens, the gamma parameter γ is, preferably, equal to 0.55.

For screens that have less good contrast, the gamma parameter γ is, preferably, equal to 0.65.

The conventional gamma transfer function $T_c(Y)$, for a photo or video coded on eight bits, is expressed by the following equation (1):

$$Y' = T_c(Y) = 255 \cdot \left(\frac{Y}{255}\right)^\gamma \quad \text{equation (1)}$$

Y: the luminance of a pixel of the original image;

Y': the luminance of said pixel after processing;

$T_c(Y)$: the conventional gamma transfer function; and

γ: adaptable gamma parameter.

FIG. 2 also shows an example of a conventional gamma transfer function $T_c(Y)$, with the parameter γ=0.55.

For a photo or a video coded on eight bits, the modified gamma transfer function $T_m(Y)$ is expressed, for example, by the following equation (2):

$$Y' = T_m(Y) = \left(\frac{DyMax - Y}{DyMax - DyMin}\right) \cdot \left(\frac{(Y - DyMin)^\gamma}{(DyMax - DyMin)^{\gamma-1}} + DyMin\right) + \frac{Y \cdot (Y - DyMin)}{DyMax - DyMin} \quad \text{equation (2)}$$

Y: the luminance of a pixel of the images of the original video;

Y': the luminance of said pixels after processing;

DyMin: the minimum of the luminance dynamic range of the image;

DyMax: the maximum of the luminance dynamic range of the image;

$T_m(Y)$: the modified gamma transfer function; and

γ: adaptable gamma parameter.

This FIG. 2 also shows an example of a modified gamma transfer function $T_m(Y)$, with the parameter γ=0.45. Also shown in FIG. 2 is the identity function Id which has the equation: Y'=Y.

The second luminance processing operation S22 is a luminance processing operation on the pixels of the second set of pixels E2 which is different from the first luminance processing operation S21 applied to the first set of pixels E1.

This second processing operation S22 can be, for example, a linear function to redistribute the luminance of the pixels over the remaining dynamic range of the image, that is to say over the second set of pixels E2.

This second processing operation can also be a conventional equalization transfer function $E_c(Y)$ for equalizing the histogram H(Y) applied to the pixels of the second set of pixels E2, or better, a smoothed equalization transfer function $E_L(Y)$. This smoothed equalization transfer function $E_L(Y)$ makes it possible to differentiate the increase in luminance of the pixels so as to preserve the contrast of the photos after equalization.

The principle of conventional non-smoothed equalization of a histogram is to redistribute the luminances of the pixels uniformly. An equalization, whether smoothed or not, can be performed on the basis of an aggregate histogram Hc(Y) of the image according to the following equation (3):

$$Hc(Y) = \sum_{u=DyMin}^{Y} H(u) \quad \text{equation (3)}$$

The smoothed equalization transfer function $E_L(Y)$ for equalizing and smoothing the histogram H(Y) may be determined from the global smoothed equalization transfer function $E_G(Y)$ which has the equation (4):

$$Y' = E_G(Y) = Y - \frac{(Y - Hc(Y) \cdot norm)}{A} \quad \text{equation (4)}$$

norm: normalization parameter, such that $$norm = \frac{binMaxOut}{Hc(DyMax)}$$

A: smoothing parameter, for example A=5.

The global luminance processing operation B(Y) therefore makes it possible to continuously process all the pixels of the digital image.

The transfer function B(Y) can be represented by the following equations (5 to 8):

$$\begin{cases} B(Y) = binMinOut, & \forall Y \in [DyMin; SC] & \text{equation (5)} \\ B(Y) = T_t(Y) = T_m(Y\text{-}SC), & \forall Y \in [SC, binMidOut] & \text{equation (6)} \\ B(Y) = E_L(Y) = E_G(Y) - E_G(binMidOut) + P1, & \forall Y \in [binMidOut, binMaxOut] & \text{equation (7)} \\ B(Y) = \dfrac{(DyMax - P2) \cdot Y + DyMax \cdot (P2 - binMaxOut)}{DyMax - binMaxOut}, & \forall Y \in [binMaxOut, DyMax] & \text{equation (8)} \end{cases}$$

SC: cut-off threshold, for example equal to 2;

$T_m(Y)$: the modified gamma transfer function;

$T_t(Y)$: the gamma transfer function $T_t(Y)$ corresponding to the first luminance processing operation S21;

$E_L(Y)$: the smoothed equalization transfer function corresponding to the second luminance processing operation S22;

P1: value of $T_t$(binMidOut), that is $P1 = T_m$(binMidOut–$Sc$); and

P2: value of $E_L$(binMaxOut), that is $P2 = E_G$(binMaxOut)–$E_G$(binMidOut)+$P1$.

It will be noted that the global luminance processing operation B(Y) is continuous over the dynamic range of the image Dy.

Furthermore, the limit values of the global luminance processing operation B(Y) can be clipped so that the resultant values from the global luminance processing operation B(Y) remain contained within the range Dy of the luminance dynamic range of the image. That is to say:

if B(Y)>DyMax, then B(Y)=DyMax; and if B(Y)<DyMin, then B(Y)=DyMin.

Moreover, a cut-off threshold SC is determined which is contained within the range [DyMin;binMidOut], and below which it is considered that the image is noise-affected. This processing operation is used to filter the noises in the very dark area of the image.

Furthermore, for the pixels that have luminances greater than or equal to the maximum threshold binMaxOut, a linear processing operation is used in the very light area of the image. This linear processing operation makes it possible, in particular when using a sampled histogram, to preserve the values of the pixels of the image that are contained within the range [BinMaxOut;DyMax].

Figure 3:
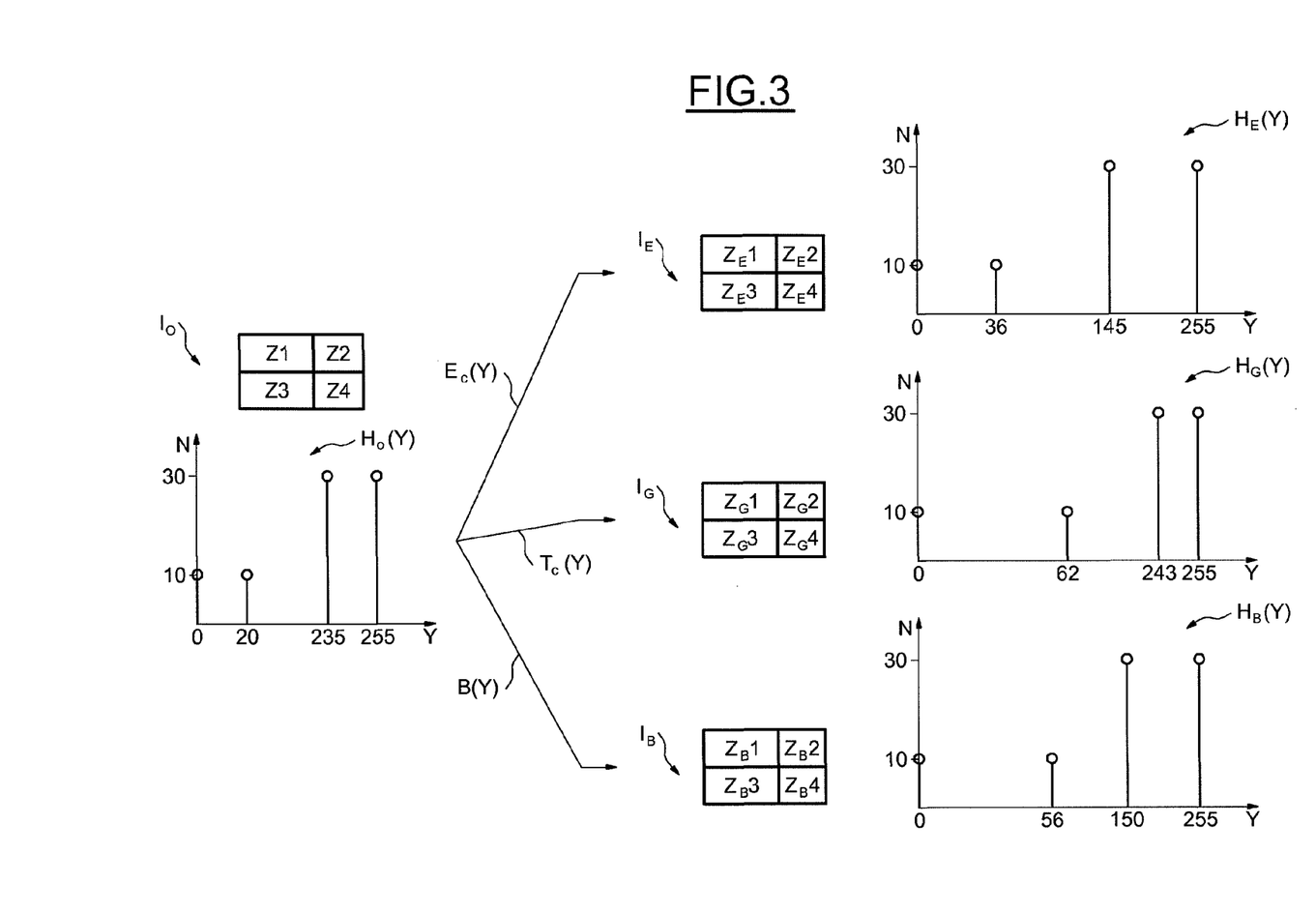
FIG. 3 diagrammatically illustrates an exemplary implementation of a processing method applied to a particular image.

FIG. 3 diagrammatically represents an exemplary implementation of a global luminance processing operation B(Y), as applied to both sets of pixels of a particular digital image $I_o$ so as to obtain an image $I_B$.

This FIG. 3 also shows, by way of comparison, two other images $I_E$, $I_G$ obtained, for the first $I_E$, from a non-smoothed conventional equalization transfer function $E_c(Y)$ applied to all the pixels of the original image $I_o$ and, for the second $I_G$, from a conventional gamma transfer function $T_c(Y)$ applied to all the pixels of the original image $I_o$.

The original digital image $I_o$ comprises four areas of pixels Z1 to Z4 and an associated histogram $H_o(Y)$ which represents the distribution of the number of pixels N of said image $I_o$ according to their luminance Y.

In this example, the first area Z1 comprises 30 pixels having a luminance equal to 235, the second area Z2 comprises 10 pixels having a luminance equal to 0, the third area Z3 comprises 30 pixels having a luminance equal to 255 and the fourth area Z4 comprises 10 pixels having a luminance equal to 20.

The non-smoothed conventional equalization transfer function $E_c(Y)$ applied to the entire luminance dynamic range Dy=[0; 255] of the original image $I_o$ is determined by the following equation (9):

$$Y' = E_c(Y) = (DyMax - DyMin) \cdot \frac{\sum_{u=DyMin}^{Y} H_0(u) - H_0(DyMin)}{Npixels - H_0(DyMin)} + DyMin \quad \text{equation (9)}$$

Y: the luminance of a pixel of the original image $I_o$;
Y': the luminance of said pixel after processing;
$H_0$: the histogram associated with the original digital image;
DyMin: the minimum value of the luminance dynamic range of the image, that is to say DyMin=0;
DyMax: the maximum value of the luminance dynamic range of the image, that is to say DyMax=255; and
Npixels: the total number of pixels of the image, that is to say Npixels=80.

This transfer function $E_c(Y)$ applied to the original image $I_o$ gives the first image $I_E$, denoted equalized image, and its associated histogram $H_E(Y)$. This equalized image $I_E$ comprises four areas of pixels $Z_E1$ to $Z_E4$. The first area $Z_E1$ comprises 30 pixels having a luminance equal to 145, the second area $Z_E2$ comprises 10 pixels having a luminance equal to 0, the third area $Z_E3$ comprises 30 pixels having a luminance equal to 255 and the fourth area $Z_E4$ comprises 10 pixels having a luminance equal to 36. This method increases the contrast of the light areas Z1 and Z3 of the original image $I_o$, but does not sufficiently lighten the dark areas Z2 and Z4.

The conventional gamma transfer function $T_c(Y)$, with $\gamma=0.55$, is applied to the entire luminance dynamic range of the original image Dy=[0;255]. This conventional gamma transfer function $T_c(Y)$ is expressed by the equation (1) described previously with FIG. 2. This conventional gamma transfer function $T_c(Y)$ applied to the original image $I_o$ gives the second image $I_G$, called increased image, and its associated histogram $H_G(Y)$. This increased image $I_G$ comprises four areas of pixels $Z_G1$ to $Z_G4$. The first area $Z_G1$ comprises 30 pixels having a luminance equal to 243, the second area $Z_G2$ comprises 10 pixels having a luminance equal to 0, the third area $Z_G3$ comprises 30 pixels having a luminance equal to 255 and the fourth area $Z_G4$ comprises 10 pixels having a luminance equal to 62. This method increases the luminance of the dark areas but reduces the contrast in the light areas, that is to say that it causes the "whiteout" phenomenon.

The transfer function B(Y) as described with the previous FIG. 2 is also applied to the entire luminance dynamic range of the original image Dy=[0;255]. The transfer function B(Y) is represented here by the previous equations (5 to 8) with the following parameters:
DyMin=0;
DyMax=255;
SC=2;
binMinOut=0;
binMidOut=20;
binMaxOut=250;
$\gamma$=0.55
A=1.

This transfer function B(Y) applied to the original image $I_o$ gives the third image $I_B$, denoted lightened image, and its associated histogram $H_B(Y)$. This lightened image $I_B$ comprises four areas of pixels $Z_B1$ to $Z_B4$.

For the first area $Z_B1$, the luminance of the first area Z1 of the original image being equal to 235, the equation (7) is applied such that $B(235)=E_L(235)=E_G(235)-E_G(20)+P1=156-62+56=150$.

For the second area $Z_B2$, the luminance of the second area Z2 of the original image being equal to 0, the equation (5) is applied such that B(0)=binMinOut=0.

For the third area $Z_B3$, the luminance of the third area Z3 of the original image being equal to 255, the equation (8) is applied such that $$B(255) = \frac{(255 - P2) \cdot 255 + 255 \cdot (P2 - 250)}{255 - 250} = 255.$$

For the third area $Z_B4$, the luminance of the fourth area Z4 of the original image being equal to 20, the equation (6) is applied such that $B(20)=T_m(18)=56$.

In conclusion, the first area $Z_B1$ comprises 30 pixels having a luminance equal to 150, the second area $Z_B2$ comprises 10 pixels having a luminance equal to 0, the third area $Z_B3$ comprises 30 pixels having a luminance equal to 255 and the fourth area $Z_B4$ comprises 10 pixels having a luminance equal to 56. This transfer function B(Y) therefore increases the luminance of the dark areas of the image while preserving the contrast of the original image $I_o$.

The result of this is therefore an improvement compared to the images $I_E$ and $I_G$.

Figure 4:
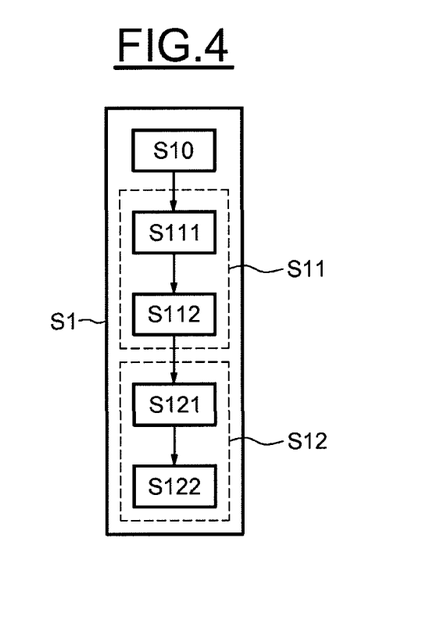
FIG. 4 diagrammatically illustrates another implementation of the digital image processing method.

FIG. 4 diagrammatically represents another implementation of the method of processing a digital image.

The computation step S1 can comprise a step S10 for computing an initial histogram Hi(Y), a step S11 for determining a luminance range Li and a step S12 for redistributing the number of pixels of the image.

Advantageously, it is also possible to compute a sampled initial histogram of the image in the same way as that used to compute the sampled histogram described with FIG. 1.

In the computation step S10, the initial histogram Hi(Y) of the distribution of the number of pixels N of the image is computed according to their luminance Y over the luminance dynamic range of the image Dy=[DyMin;DyMax].

Then, in the determination step S11, the luminance range Li=[binMinIn;binMaxIn], above and below which the initial histogram Hi(Y) is nil, is determined, within the range Dy.

There is then performed the step S13 for redistributing the number of pixels of the luminance range Li in the range contained between said low threshold binMinOut and said maximum threshold binMaxOut so as to compute said histogram H(Y).

It is possible, for example, to use a redistribution transfer function R(Y) according to the following equation (10):

$$Y' = R(Y) = \frac{DyMax - DyMin}{binMaxIn - binMinIn} \cdot (Y - binMinIn) + DyMin \quad \text{equation (10)}$$
$$\forall Y \in [binMinIn, binMaxIn]$$

This transfer function R(Y) makes it possible to redistribute the pixels uniformly over the entire extent of the dynamic range of the image Dy.

In this case, said high threshold binMidOut will preferably be computed according to the following equation (11):

$$binMidOut = \frac{DyMax - DyMin}{binMaxIn - binMinIn} \cdot (binMidIn - binMinIn) + binMinOut \quad \text{equation (11)}$$

It is also possible to choose not to use the entire dynamic range of the image and to redistribute differently the very dark pixels contained in a first dark area Zs relative to the pixels contained in a second less dark area Zc.

A luminance limit is then determined between the two areas Zs, Zc by an initial threshold binMidIn that is contained within the range [10; 80]∈Dy. Preferably, said initial threshold binMidIn is equal to 20.

To perform two different redistributions according to the areas of the image Zs, Zc, in the step S11 for determining the luminance range Li, the first area Zs=[binMinIn; binMidIn] is determined S111 and the second area Zc=[binMidIn; binMaxIn] is determined S112.

Then, in the step S12 for redistributing the number of pixels of the image, a first step S121 for redistributing the number of pixels of the first area Zs within the range contained between said low threshold binMinOut and said high threshold binMidOut is performed, and a second step S122 for redistributing the number of pixels of the second area Zc in the range contained between said high threshold binMidOut and said maximum threshold binMaxOut is performed so as to compute said histogram H(Y).

It is possible, for example, to use a first redistribution transfer function R1(Y) according to the following equation (12):

$$Y'=R1(Y)=\beta \cdot (Y-binMinIn)+binMinOut \forall Y\in[binMinIn; binMidIn] \quad \text{equation (12)}$$

β: the amplification factor of the first set of pixels E1, such that $$\beta = \frac{binMidOut - DyMin}{binMidIn - binMinIn}.$$

For example, it is possible to use a second redistribution transfer function R2(Y) according to the following equation (13):

$$Y'R2(Y) = \frac{DyMax - binMidOut}{binMaxIn - binMidIn} \cdot (Y - binMidIn) + binMidOut \quad \text{equation (13)}$$
$$\forall Y \in [binMidIn, binMaxIn]$$

As a variant, the step S11 for determining a luminance range Li can comprise a step for determining a third area Zn contained within said luminance range Li. This third area Zn corresponds to an area in which the initial histogram Hi(Y) is nil; it comprises a bottom limit binZeroMin and a top limit binZeroMax.

The first step S111 for redistributing the number of pixels contained within the range [binMinIn,binZeroMin] in the range between said low threshold binMinOut and said high threshold binMidOut is then performed, and the second step S112 for redistributing the number of pixels contained within the range [binZeroMax;binMaxIn] in the range between said high threshold binMidOut and said maximum threshold binMaxOut is performed so as to compute said histogram H(Y).

In this variant, said high threshold binMidOut will preferably be computed according to the following equation (14):

$$binMidOut = \frac{DyMax - DyMin}{binMaxIn - binMinIn} \cdot (binZeroMin - binMinIn) + \alpha \cdot (binZeroMax - binZeroMin) + binMinOut \quad \text{equation (14)}$$

α: constant parameter, for example equal to 0.5.

Finally, regardless of the redistribution step that is used, the top limit binMaxOut of the range of the second set of pixels E2 must not be less than the top limit binMaxIn of the luminance range Li of the initial histogram Hi(Y), in order to avoid darkening the image.

Figure 5:
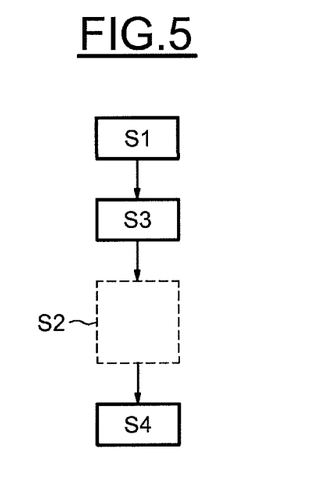
FIG. 5 diagrammatically illustrates yet another implementation of the digital image processing method.

FIG. 5 diagrammatically shows another implementation of the method of processing a digital image. The figure includes certain steps described in the preceding figures.

The method can comprise a detection step S3 for detecting an underexposure of the image. The use of this detection step S3 makes it possible to decide whether or not to perform the next step S2 for lightening the image.

During this detection step S3, two tests are carried out.

A first test to estimate the proportion of pixels that have a dark luminance based on the computed histogram H(Y). This first test includes the computation of a first darkening criterion Sum_A according to the following equation (15):

$$\text{Sum\_A} = \sum_{Y=DyMin}^{Ygrey} H(Y) \quad \text{equation (15)}$$

Ygrey: luminance value contained in the range Dy, for example, Ygrey=100.

If the first darkening criterion Sum_A is greater than a threshold τ determined according to a percentage of the size of the image, for example ¾ of the size of the image, the lightening step S2 is carried out.

A second test can also be performed to estimate the proportion of pixels that have a dark luminance based on the computed histogram H(Y). This second test comprises the computation of second and third darkening criteria Sum_B and Sum_C according to the following equations (16) and (17):

$$\text{Sum\_B} = \sum_{Y=DyMin}^{Yblack} H(Y) \qquad \text{equation (16)}$$

$$\text{Sum\_C} = \sum_{Y=Yblack+1}^{Ygrey} H(Y) \qquad \text{equation (17)}$$

Yblack: luminance value contained in the range Dy, such that Yblack<Ygrey, for example, Yblack=50.

Furthermore, the third darkening criterion makes it possible to compute the equation of a straight line D1 according to the second darkening criterion according to the following equation (18):

$$y = \theta \cdot \text{Sum\_B} + \rho \qquad \text{equation (18)}$$

θ: constant parameter equal to 1.21; and
ρ: constant parameter equal to −1380.

In this case, if the first darkening criterion Sum_A is greater than or equal to said determined threshold τ and if the third darkening criterion Sum_C is less than or equal to the straight line D1, that is to say, if Sum_C≤θ Sum_B+ρ, the next lightening step S2 is carried out and the method is stopped otherwise.

The image processing method can also include a step S4 for enhancing some of the colours of the image. In this step of colour enhancement, the chrominance of each pixel of the image is increased according to a ratio between the lightened luminance and the original luminance of said pixel of the image.

It is possible, for example, to modify the chrominance of the pixels of the original image according to the following equations (19) and (20):

$$U' = \frac{Y'}{Y} \cdot ((U - 128) + 128) \qquad \text{equation (19)}$$

$$V' = \frac{Y'}{Y} \cdot ((V - 128) + 128) \qquad \text{equation (20)}$$

U: blue chrominance of a pixel of the original image
U': blue chrominance of the pixel after modification
V: red chrominance of a pixel of the original image
V': red chrominance of the pixel after modification The method of processing a digital image described in the preceding figures can also be applied to a plurality of successive digital images of a video sequence, wherein the computation step S1 and the lightening step S2 are carried out on each digital image.

In this method, said initial threshold binMidin has a constant value, preferably equal to 20, for each processing operation on said successive digital images.

It is also possible to improve the processing of the video sequence by applying a time filter $B_v(Y,t)$ to said video sequence. The aim of this time filter $B_v(Y,t)$ is to smooth the global luminance processing operation B(Y) so that the global luminance processing operation B(Y,t) applied to an image of the sequence at the time t is not too different from the global luminance processing operation B(Y,t−1) applied to the preceding image of the sequence, that is to say at the preceding time t−1.

For example, it is possible to apply the time filter $B_v(Y,t)$ which is expressed by the following equation (21):

$$B_v(Y, t) = \frac{(\text{FAC\_LISS} - 1) \cdot B(Y, t-1) + B(y, t)}{\text{FAC\_LISS}} \qquad \text{equation (21)}$$

t: the current time;
t−1: the preceding time; and
FAC_LISS: smoothing factor, for example equal to 16.

Figure 6:
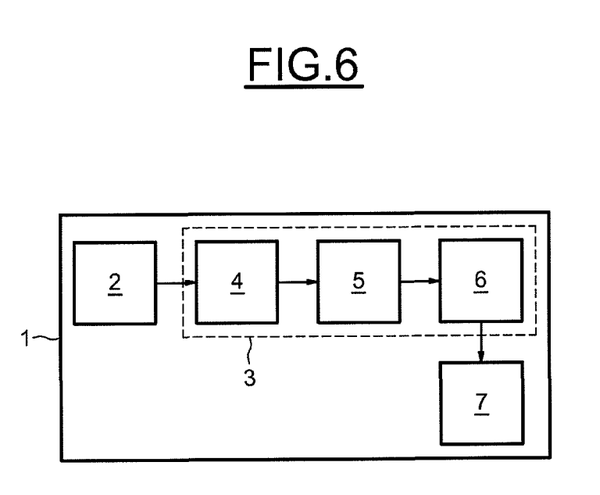
FIG. 6 diagrammatically illustrates an embodiment of a device for processing one or more digital images.

FIG. 6 diagrammatically shows a digital image processing device 1 that is able to implement the method described in the preceding figures.

This digital image processing device 1 comprises a computation means 2 for computing a histogram of the distribution of the number of pixels of the image as a function of their luminance, a lightening means 3 for lightening the image based on said histogram.

This lightening means 3 comprises a subdivision means 4 for subdividing the pixels of the image into a first set of pixels having luminance values between a low threshold and a high threshold and into a second set of pixels having luminance values between said high threshold and a maximum threshold.

The lightening means 3 further comprises a first luminance processing means 5 for performing a first luminance processing operation on the pixels of the first set of pixels and a second luminance processing means 6 for performing a second luminance processing operation on the pixels of the second set of pixels, the two luminance processing operations being different, the first processing operation comprising an increase in the luminance of the pixels of the image.

This device 1 can also comprise a means 7 for enhancing some of the colours of the image to increase the chrominance of each pixel of the image according to a ratio between the lightened luminance and the original luminance of said pixel of the image.

All these means can be produced as software, or also in the form of logic circuits, and can be embedded in a computer or in a microprocessor.

Figure 7:
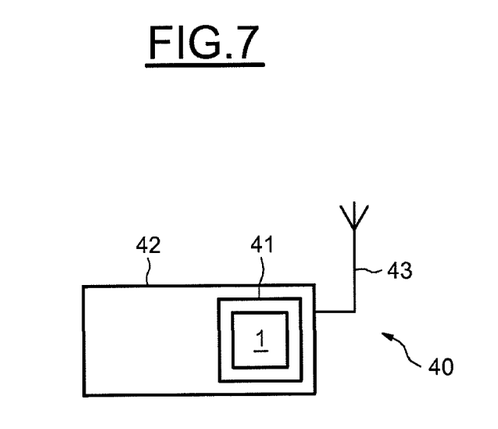
FIG. 7 diagrammatically illustrates an embodiment of a wireless communication appliance comprising a device for processing one or more digital images.

FIG. 7 diagrammatically shows a wireless communication appliance 40 including a digital image capture appliance 41.

The wireless communication appliance 40 comprises a casing 42 and an antenna 43 for sending/receiving digital data. Such a wireless communication appliance can be, for example, a mobile telephone.

The digital image capture appliance 41 is able to capture images Pi and/or videos Vi.

This digital image capture appliance 41 comprises a digital image processing device 1.

The invention claimed is:
1. A computer-implemented method of processing a digital image, said image comprising a plurality of pixels, the method comprising:
computing a histogram of a distribution of the number of pixels of the image as a function of their luminance;
subdividing the pixels of the image into a first set of pixels having luminance values between a low threshold and a high threshold, and into a second set of pixels having luminance values greater than the high threshold;
performing a first luminance processing operation on the first set of pixels that comprises increasing the luminance of the first set of pixels; and performing a different second luminance processing operation on the second set of pixels;
wherein the method is implemented by a computer.

2. The computer-implemented method of claim 1, wherein the first luminance processing operation further comprises a gamma-type transfer function processing operation having an adaptable gamma parameter that is applied to the first set of pixels.

3. The computer-implemented method of claim 1, wherein the second luminance processing operation comprises an equalization of the histogram applied to the second set of pixels.

4. The computer-implemented method of claim 1, wherein the second set of pixels have luminance values between the high threshold and a maximum threshold, and wherein said computing a histogram comprises:
computing an initial histogram;
determining a luminance range above and below which the values of the initial histogram are nil; and
redistributing the pixels in the luminance range between said low threshold and said maximum threshold so as to compute said histogram.

5. The computer-implemented method of claim 4, further comprising:
wherein determining a luminance range above and below which the values of the initial histogram are nil comprises:
determining a first area between the bottom limit of the luminance range and an initial threshold; and
determining a second area between said initial threshold and the top limit of the luminance range; and
wherein redistributing the pixels in the luminance range between said low threshold and said maximum threshold comprises:
performing a first redistribution of the pixels in the first area in the range between the low threshold and the high threshold; and
performing a second redistribution of the pixels in the second area in the range between the high threshold and the maximum threshold so as to compute said histogram.

6. The computer-implemented method of claim 1, further comprising:
enhancing some of the colors of the image by amplifying the chrominance of each pixel of the image according to a ratio between the lightened luminance and the original luminance of said pixel of the image.

7. The computer-implemented method of claim 1, wherein the method is repeatedly performed to process a plurality of successive digital images of a video sequence, and wherein said high threshold has a constant value for each processing operation on the successive digital images.

8. A device for processing and lightening a digital image comprising a plurality of pixels, the device comprising at least one logic circuit or a microprocessor that is configured to:
compute a histogram of the distribution of the number of pixels of the image as a function of their luminance;
subdivide the pixels of the image into a first set of pixels having luminance values between a low threshold and a high threshold and into a second set of pixels having luminance values greater than the high threshold;
perform a first luminance processing operation on the pixels of the first set of pixels, the first processing operation comprising an increase in the luminance of the pixels of the first set; and
perform a different second luminance processing operation on the pixels of the second set of pixels.

9. The device of claim 8, wherein the first luminance processing operation comprises a gamma-type transfer function processing operation having an adaptable gamma parameter applied to the first set of pixels.

10. The device of claim 8, wherein the second luminance processing operation comprises an equalization of the histogram applied to the second set of pixels.

11. The device of claim 8, wherein the second set of pixels have luminance values between the high threshold and a maximum threshold, and wherein to compute the histogram, the at least one logic circuit or microprocessor is configured to:
compute an initial histogram;
determine a luminance range above and below which the values of the initial histogram are nil; and
redistribute the pixels in the luminance range between said low threshold and said maximum threshold so as to compute said histogram.

12. The device of claim 11, further comprising:
wherein to determine the luminance range above and below which the values of the initial histogram are nil, the at least one logic circuit or microprocessor is configured to:
determine a first area between the bottom limit of the luminance range and an initial threshold; and
determine a second area between said initial threshold and the top limit of the luminance range; and
wherein to redistribute the pixels in the luminance range between said low threshold and said maximum threshold, the at least one logic circuit or microprocessor is configured to:
perform a first redistribution of the pixels of the first area in the range between the low threshold and the high threshold; and
perform a second redistribution of the number of pixels of the second area in the range between the high threshold and the maximum threshold so as to compute said histogram.

13. The device of claim 8, wherein the at least one logic circuit or microprocessor is further configured to:
enhance some of the colors of the image to amplify the chrominance of each pixel of the image according to a ratio between the lightened luminance and the original luminance of said pixel of the image.

14. The device of claim 8, wherein the at least one logic circuit or microprocessor is further configured to process and lighten a plurality of successive digital images of a video sequence, wherein each of the plurality of successive digital images has a constant high threshold value.

15. A wireless communication appliance comprising a digital image processing device for processing and lightening a digital image comprising a plurality of pixels, the device including at least one logic circuit or a microprocessor that is configured to:
compute a histogram of the distribution of the number of pixels of the image as a function of their luminance;
subdivide the pixels of the image into a first set of pixels having luminance values between a low threshold and a high threshold and into a second set of pixels having luminance values greater than the high threshold;
perform a first luminance processing operation on the pixels of the first set of pixels, the first processing operation comprising an increase in the luminance of the pixels of the first set; and
perform a different second luminance processing operation on the pixels of the second set of pixels.

16. A computer-implemented method of processing a digital image, said image comprising a plurality of pixels, the method comprising:
  computing a histogram of a distribution of the number of pixels of the image as a function of their luminance;
  subdividing the pixels of the image into a first set of pixels having luminance values between a low threshold and a high threshold, and into a second set of pixels having luminance values greater than the high threshold;
  performing a first luminance processing operation on the first set of pixels, the first luminance processing operation comprising a gamma-type transfer function processing operation having an adaptable gamma parameter applied to the first set of pixels for increasing the luminance of the first set of pixels; and
  performing a different, second luminance processing operation on the second set of pixels, the second luminance processing operation comprising an equalization of the histogram applied to the second set of pixels;
  wherein the method is implemented by a computer.

17. The computer-implemented method of claim 16, wherein the pixels of the second set have luminance values between the high threshold and a maximum threshold, and wherein said computing a histogram comprises:
  computing an initial histogram;
  determining a luminance range above and below which the values of the initial histogram are nil; and
  redistributing the pixels in the luminance range between said low threshold and said maximum threshold so as to compute said histogram.

18. The computer-implemented method of claim 17, further comprising:
  wherein determining a luminance range above and below which the values of the initial histogram are nil comprises:
    determining a first area between the bottom limit of the luminance range and an initial threshold; and
    determining a second area between said initial threshold and the top limit of the luminance range;
  wherein redistributing the pixels in the luminance range between said low threshold and said maximum threshold comprises:
    performing a first redistribution of the pixels in the first area in the range between the low threshold and the high threshold; and
    performing a second redistribution of the pixels in the second area in the range between the high threshold and the maximum threshold so as to compute said histogram.

19. The method of claim 16, further comprising:
  enhancing some of the colors of the image by amplifying the chrominance of each pixel of the image according to a ratio between the lightened luminance and the original luminance of said pixel of the image.

20. The method of claim 16, wherein the method is repeatedly performed to process a plurality of successive digital images of a video sequence, and wherein said high threshold has a constant value for each processing operation on the successive digital images.

21. A device for processing and lightening a digital image comprising a plurality of pixels, the device comprising at least one logic circuit or a microprocessor that is configured to:
  compute a histogram of the distribution of the number of pixels of the image as a function of their luminance;
  subdivide the pixels of the image into a first set of pixels having luminance values between a low threshold and a high threshold and into a second set of pixels having luminance values greater than the high threshold;
  perform a first luminance processing operation on the first set of pixels, the first luminance processing operating comprising a gamma-type transfer function processing operation having an adaptable gamma parameter applied to the first set of pixels for increasing the luminance of the first set of pixels; and
  perform a different, second luminance processing operation on the second set of pixels, the second luminance processing operation comprising an equalization of the histogram applied to the second set of pixels.

22. The device of claim 21, wherein the second set of pixels have luminance values between the high threshold and a maximum threshold, and wherein to compute the histogram, the at least one logic circuit or microprocessor is configured to:
  compute an initial histogram;
  determine a luminance range above and below which the values of the initial histogram are nil; and
  redistribute the pixels in the luminance range between said low threshold and said maximum threshold so as to compute said histogram.

23. The device of claim 22, further comprising:
  wherein to determine the luminance range above and below which the values of the initial histogram are nil, the at least one logic circuit or microprocessor is configured to:
    determine a first area between the bottom limit of the luminance range and an initial threshold; and
    determine a second area between said initial threshold and the top limit of the luminance range; and
  wherein to redistribute the pixels in the luminance range between said low threshold and said maximum threshold, the at least one logic circuit or microprocessor is configured to:
    perform a first redistribution of the pixels of the first area in the range between said low threshold and said high threshold; and
    perform a second redistribution of the number of pixels of the second area in the range between said high threshold and the maximum threshold so as to compute said histogram.

24. The device of claim 21, wherein the at least one logic circuit or microprocessor is further configured to:
  enhance some of the colors of the image to amplify the chrominance of each pixel of the image according to a ratio between the lightened luminance and the original luminance of said pixel of the image.

25. The device of claim 21, wherein the at least one logic circuit or microprocessor is further configured to process and lighten a plurality of successive digital images of a video sequence, wherein each of the plurality of successive digital images has a constant high threshold value.

26. A wireless communication appliance comprising a digital image processing device for processing and lightening a digital image comprising a plurality of pixels, the device including at least one logic circuit or a microprocessor that is configured to:
  compute a histogram of the distribution of the number of pixels of the image as a function of their luminance;
  subdivide the pixels of the image into a first set of pixels having luminance values between a low threshold and a high threshold and into a second set of pixels having luminance values greater than the high threshold;
  perform a first luminance processing operation on the first set of pixels, the first luminance processing operating comprising a gamma-type transfer function processing operation having an adaptable gamma parameter applied to the first set of pixels for increasing the luminance of the first set of pixels; and perform a different, second luminance processing operation on the second set of pixels, the second luminance processing operation comprising an equalization of the histogram applied to the second set of pixels.

\* \* \* \* \*